(12) United States Patent
Dickens et al.

(10) Patent No.: US 7,930,453 B2
(45) Date of Patent: Apr. 19, 2011

(54) METHOD AND APPARATUS FOR TRANSMITTING AUDIO AND VIDEO SIGNAL VIA THREE TWISTED PAIRS OF CONDUCTORS

(75) Inventors: Nigel Anthony Dickens, Swaffham Bulbeck (GB); Darrin John Steel, Caldecote (GB); Philip Edward Hudson, Sandy (GB)

(73) Assignee: Adder Technology Limited, Cambridge (GB)

( * ) Notice: Subject to any disclaimer, the term of this patent is extended or adjusted under 35 U.S.C. 154(b) by 1335 days.

(21) Appl. No.: 11/419,885

(22) Filed: May 23, 2006

(65) Prior Publication Data

US 2006/0282561 A1 Dec. 14, 2006

(51) Int. Cl.
*G06F 13/12* (2006.01)

(52) U.S. Cl. .......................................... 710/64; 710/72

(58) Field of Classification Search .................. 348/495, 348/496; 174/27; 725/127; 710/33, 64, 710/72; 375/257, 288, 295
See application file for complete search history.

(56) References Cited

U.S. PATENT DOCUMENTS

| 5,699,013 | A * | 12/1997 | Smith ............................. 330/51 |
| 6,307,543 | B1 | 10/2001 | Martin |
| 6,618,774 | B1 | 9/2003 | Dickens et al. |
| 2002/0024591 | A1 * | 2/2002 | Fenouil ..................... 348/14.09 |

FOREIGN PATENT DOCUMENTS

GB 2 219 712 A1 5/1998

* cited by examiner

*Primary Examiner* — Victor Kostak
(74) *Attorney, Agent, or Firm* — Kory D. Christensen; Stoel Rives LLP (57) ABSTRACT

A system, apparatus and methods for transmitting video and audio data over twisted pairs are described. A differential signal that contains video color information is transmitted over each twisted pair. Data representing digital samples of at least one audio signal is transmitted on two or more of the twisted pairs as a common mode signal.

16 Claims, 5 Drawing Sheets

METHOD AND APPARATUS FOR TRANSMITTING AUDIO AND VIDEO SIGNAL VIA THREE TWISTED PAIRS OF CONDUCTORS

FIELD OF THE INVENTION

The present invention relates to transmitting video colour signals and audio signals over the same pairs of a twisted pair cable.

BACKGROUND

It is often desirable to be able to transmit audio and video signals over a twisted pair cable. In retail applications it is common for displays with integral speakers to be located at various locations within a shop. These displays are commonly driven from computers located in an equipment room that are connected to the displays via audio and video extension equipment that typically uses twisted pair cable.

In KVM (Keyboard, Video Monitor, Mouse) applications it is often useful to be able to transmit keyboard, video, mouse and audio signals over a single twisted pair cable.

The type of twisted pair cable that is commonly used for video extension applications is the same as that commonly used for networking applications. The cable consists of four individual twisted pairs each of which is designed to carry a differential signal. Three of the four twisted pairs can be used to carry red, green and blue analogue colour signals and the remaining pair can be used to carry digital data, which may include keyboard data, mouse data, RS232 data, digital audio data, USB data and control data associated with the operation of the extender.

It can be preferred to transmit audio signals digitally as analogue audio signals can be subject to noise which can be heard as hisses and crackles when no audio is being played. This is particularly so when analogue audio signals are multiplexed with other signals because it is hard to fully isolate the effect of the multiplexed signals on the analogue audio signals. Audio signals that are digitally sampled at 44.1 kHz with a 16 bit resolution give a good audio quality that is acceptable for many practical applications.

Keyboard, mouse, RS232 and extender control data typically requires a relatively slow signalling rate of a few hundred thousand bits per second. Signalling at this slow rate can be accomplished by connecting the I/O pins of a cheap, simple microprocessor (such as a PIC 16-series microprocessor as provided by MicroChip Inc.) to line drivers that are connected to the digital data twisted pair. However, digital audio data requires a higher signalling speed than can be readily achieved by this method. Therefore, when digital audio signals are to be transmitted an FPGA or programmable logic device can be used to provide the higher speed signalling and to multiplex the various signals together by interleaving the transmission of data for each device in sequence. For example a KVM extender that sends a video signal via three pairs and a sampled digital audio signal, multiplexed with other digital data over the fourth pair is the AdderLink X2-GOLD provided by Adder Technology Limited of Cambridge, United Kingdom.

Hence, it would be advantageous to be able to provide an extender device that enables an analogue video signal and a digital audio signal to be transmitted over a single twisted pair cable in a simpler way. It would also be beneficial if the extender device did not require the digital audio data to be multiplexed with other data on a data pair of the twisted pair cable. Further, an extender device that avoided the cost and complexity of data multiplexing circuitry would also be advantageous. Such an extender device would have utility in many applications. Such applications include video and audio extenders for the retail market where the manufacture cost of the extender is a significant factor and so a device that provides digital audio and analogue video extension at low cost is very advantageous.

A further significant application for such an extender device is in KVM switch systems that use twisted pair (CATx) cable. KVM switches enable one or more KVM consoles to access computers connected to the KVM switch. The KVM switch is typically connected directly to each computer's keyboard, mouse and video port using suitable cables. CATx style KVM switches are a variant of KVM switches. Instead of connecting directly to each computer, CATx KVM switches are connected via a CATx twisted pair cable to a small interface device, located near to the computer, that in turn connects to the computer's keyboard, video and mouse ports. The interface device contains a miniature circuit that converts the computer's native video, mouse and keyboard signals into signals that are suitable for transmission over the twisted pair cable and vice versa.

This is an advantageous approach for larger KVM switch systems because the cabling complexity in server rooms is simplified and interface devices can be built to connect to different types of computer, for example those with PS/2, USB or legacy Sun keyboard and mouse connectors. The common twisted pair cable interface simplifies the design of the KVM switch and enables smaller and neater KVM switches to be built with large numbers of ports. However, the commercial viability of the overall system is very sensitive to the cost of the interface devices as each computer requires an interface device.

It is desirable to support keyboard, mouse, video and audio signals on modem CATx KVM switches. It can therefore be seen that an interface device that provided this functionality whilst avoiding the need to implement costly circuitry to multiplex high speed audio data with keyboard and mouse data on the data pair of the cable would be advantageous.

BRIEF SUMMARY

The current invention provides a solution to the problem of sending analogue video signals and audio signals over a single twisted pair cable in a cost effective manner. It achieves this using a small number of components that can easily be implemented without using an FPGA or a similar complex programmable logic device. Consequently the invention provides a more cost effective solution than previous extenders and is particularly useful in cost sensitive applications such as extenders for retail displays and CATx KVM switch products.

According to the present invention, there are provided methods, apparatus, circuitry and systems for transmitting video and audio signals via twisted pairs of conductors. A differential signal that contains video colour information is transmitted over twisted pairs. Data representing digital samples of one or more audio signals are transmitted on two or more of the twisted pairs as a common mode signal.

A cost effective and simple solution is provided by sending sampled audio signals as digital data on the same twisted pairs that are also carrying red, green and blue analogue video signals. This also allows other slower speed digital data, such as keyboard data, mouse data, RS232 data, and control data (for example, data indicating the sync polarity of the original video signal) to be sent on the fourth twisted pair by connecting I/O pins of a simple microprocessor to the twisted pair line driver.

The invention also enables stereo digital audio signals to be carried together with red, green and blue colour signals using only three twisted pairs. The invention provides an elegant solution because it uses very few components to implement and is particularly straightforward to implement at the video source end, which is highly advantageous when used within device interface circuits for CATx KVM switches.

BRIEF DESCRIPTION OF THE DRAWINGS

Embodiments of the present invention will now be described, by way of example only, and with reference to the accompanying drawings in which.

DETAILED DESCRIPTION

Much of the simplicity and elegance of the current invention is achieved by using common mode signalling techniques between three twisted pairs to send two data signals that are produced by an audio codec. These data signals contain information about digital samples of a left and a right audio channel. Consequently, to aid the reader in the understanding of the operation of the current invention, it is helpful to firstly review aspects of differential and common mode signalling using twisted pairs.

Differential signalling using a pair of conductors is a well understood technique and enables high speed signals to be transmitted with high noise immunity and low electromagnetic interference, particularly when used with a twisted pair of conductors. It works by applying a signal to the first conductor and an equal and opposite signal to the second conductor. The receiver takes the difference between the signals on the first and second conductors. For example, +2V may be applied to the first conductor and −2V may applied to a second conductor, the difference being 4V.

A common mode signal appears on both conductors at the same time and is therefore the mid-point between two differential signals. In the example above the common mode signal would be 0V, half way between +2V and −2V. If the voltages on the conductors had been +6V and +2V then the differential signal would still be +4V but the common mode signal would now be +4V. It can therefore be seen that common mode signals may be independent of differential mode signals and provide a further independent signalling method.

However, common mode signalling has some limitations compared with differential signalling. Particularly, higher speed common mode signals can create significant electromagnetic emissions and cause difficultly meeting emission regulations. The signalling rates required to send the digital data signals 119,120 produced by the codec in the device are too high to enable simple common mode signalling to be used whilst meeting emission regulations.

Consequently a further technique can be used that makes use of the common mode signals of two pairs of conductors and which will be referred to as 'balanced common mode signalling'. Using the same general concept as differential signalling, a common mode signal is applied to a first pair of conductors and an equal and opposite common mode signal is applied to a second pair of conductors. This technique of balanced common mode signalling reduces emissions and is sufficient to enable the signal frequencies required by the invention to be transferred whilst meeting emission regulations.

Several techniques of balanced common mode signalling are possible as alternate embodiments of the invention. For simplicity of implementation at the transmitting end, two digital signals, a clock signal 119 and a sampled audio signal 120, are transferred from the transmitter to the receiver using common mode signalling. However, three pairs of conductors only enable one balanced common mode signalling path at any one time.

One solution to this problem uses a voltage level 2X to represent the first signal and a voltage level of −X to represent the second signal. This solution is described in greater detail below and with reference to FIG. 5. In summary, this technique adds the two signals together and transmits them over a single balanced common mode signalling path using two twisted pairs. Voltage comparators are then used at the receiver end to detect if the resultant signal was higher than −X/2, X/2 and 3X/2. Using the results of these comparisons, the state of the original two signals can be recovered. This technique works but is less elegant than the solution implemented by the preferred embodiment of the invention which requires fewer components and so is simpler and more cost effective to implement.

The preferred embodiment of the invention uses the combination of an EL4543 triple transmitter and an EL9111 triple receiver chip, both provided by Intersil Corporation. This receiver/transmitter pair is designed to encode horizontal (Hsync) and vertical sync (Vsync) signals using balanced common mode signalling techniques. The encoding is accomplished using common mode signals on three pairs of conductors. At any one time two of the three pairs are carrying equal and opposite balanced common mode signals. For example, if one pair is carrying +V volts then the second pair is carrying −V volts. The third pair carries a common mode signal that is the average of the other two common mode signals, the mid point signal. By varying which pair carries a positive signal, which carries a negative signal and which carries the mid-point signal, up to six states can be signalled. This technique enables the four possible states of the Vsync and Hsync signals to be encoded whilst still ensuring balanced common mode signalling for minimised emissions.

However, the preferred embodiment of the present invention encodes the horizontal and vertical sync signals together with the video colour signals and transmits these as differential signals. Consequently, the common mode signalling is not needed for transmitting these signals. The sync signalling ability of the Intersil EL4543/EL9111 transmitter/receiver pair is instead used to carry two data signals from the audio codec (clock signal 119 and data signal 120). It has been found that the Intersil transmitter/receiver pair is able to support the required bandwidth to carry these two digital signals whilst also meeting emission regulations. Consequently, this arrangement provides a particularly neat and straightforward implementation for carrying digital audio signals using a balanced common mode signalling technique.

Figure 1:
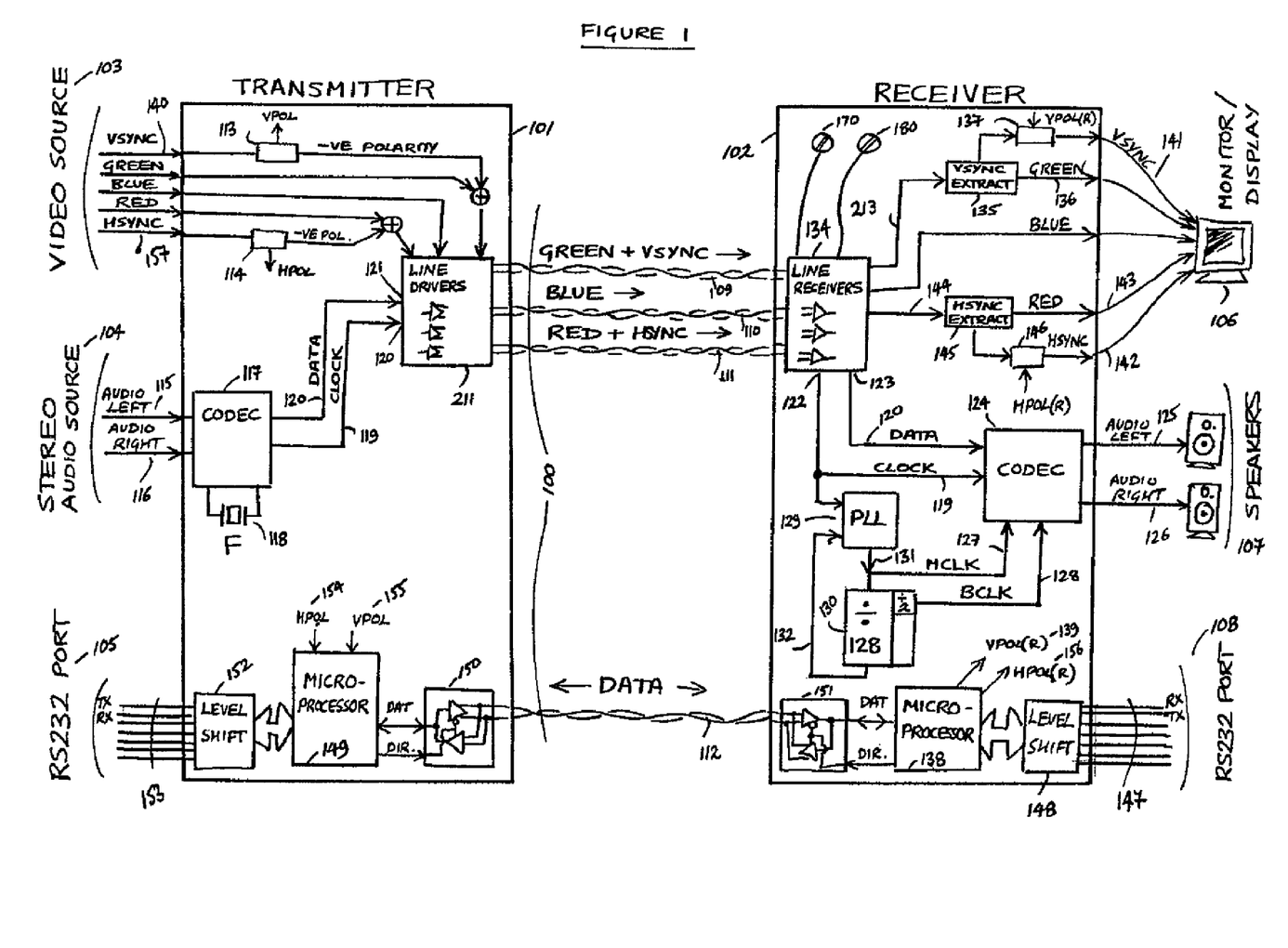
FIG. 1 is a schematic block diagram of a KVM extender including an extender device according to the invention.

The detailed operation of the invention will now be described in greater detail with reference to FIG. 1 which shows a schematic block diagram of a KVMA extender according to an embodiment of the invention. The preferred embodiment is a video, audio and RS232 extender, that enables RGB video, stereo audio and RS232 signals to be extended by up to 300 meters using common twisted pair cabling. The extender consists of a transmitter circuit 101 and a receiver circuit 102. The transmitter circuit 101 is connectable to a video source 103, a stereo audio source 104 and an RS232 serial port 105. These sources would commonly be supplied by a conventional PC but may also be supplied by other types of equipment. The receiver circuit 102 is connectable to a display device 106, a set of speakers 107 and an RS232 port 108. The twisted pair cable is of the conventional type that is commonly used for Ethernet and other networking applications and which consists of four twisted pairs of conductors 109, 110, 111 and 112.

Figure 2A:
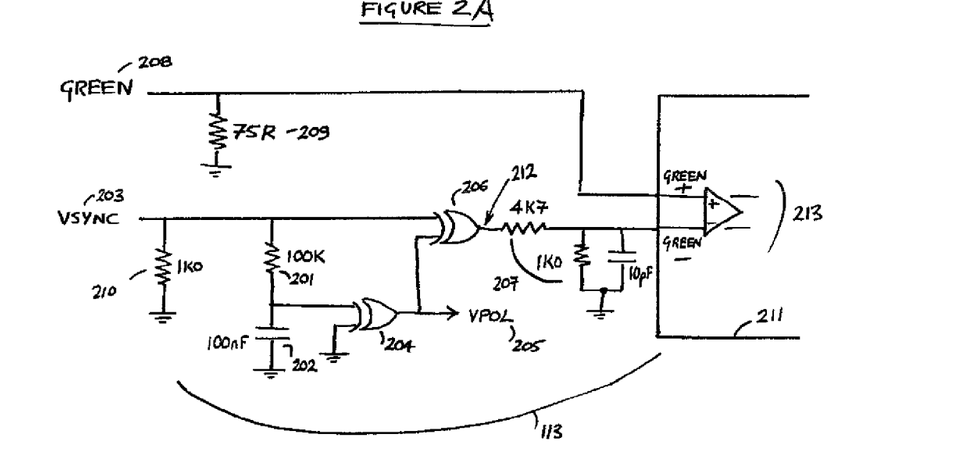
FIGS. 2A to 2E respectively illustrate a portion of the circuitry of the extender device shown in FIG. 1 and associated example signals appearing at various points within the circuit.
Figure 2B:
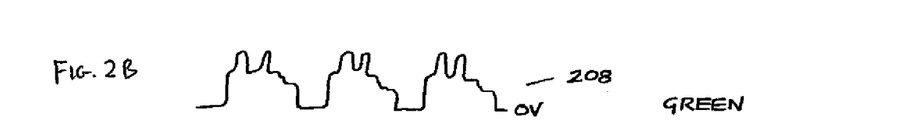
Figure 2C:
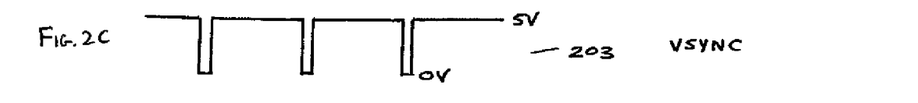
Figure 2D:
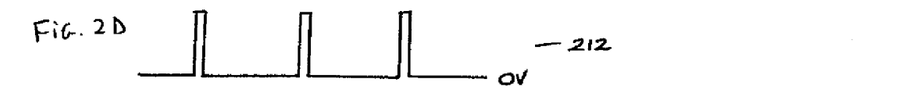
Figure 2E:
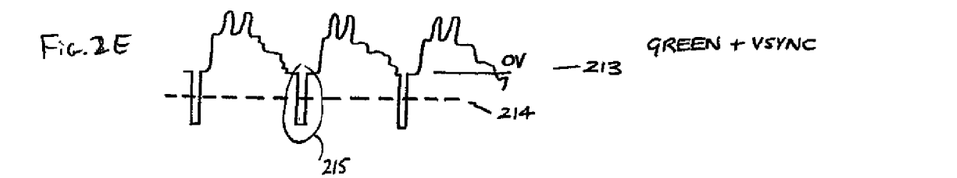

Red, green and blue colour signals and horizontal and vertical synchronisation signals are provided to the transmitter circuit 101 by the video source 103. The vertical synchronisation signal (Vsync) is fed into a polarity detection and conversion circuit 113. The Vsync signal may be mainly 5V and change to 0V to indicate the vertical sync period or it may be mainly 0V and change to 5V to indicate the vertical sync period. In order to be able to add the Vsync signal to the green signal the Vsync signal is convert into a common polarity. This is done by the circuit shown in FIG. 2A.

A resistor plus capacitor combination 201,202 is used to detect the average level of the incoming Vsync signal. A signal representing the detected polarity 205 is presented at the output of the Exclusive Or gate 204. This signal is fed into the input of a further Exclusive Or gate 206 which serves to ensure that the polarity of the sync pulses presented at its output is consistent regardless of the polarity of the incoming Vsync signal. This signal is then appropriately level converted using a resistor divider 207 and subtracted from the incoming green video signal 208 by feeding the signals into appropriate input pins of the Intersil EL4543, 211. Appropriate termination resistors 209,210 are provided for the incoming green video and Vsync signals. FIGS. 2B, 2C, 2D and 2E respectively show illustrative examples of incoming green 208, Vsync 203, converted Vsync 212 and the resultant summed signal 213.

A similar polarity detection and conversion circuit 114 is provided to handle the Hsync signal so this may be added to the red colour signal. No synchronisation signal is applied to the blue colour signal and this is fed directly into the EL4543 triple line driver chip 211. The Hsync and Vsync signals could be added to any of the colours and it is an arbitrary choice to add the Vsync to the green colour signal and the Hsync to the red colour signal. The Hysnc and Vsync pulses can easily be combined with video colour signals as the colour signals always indicate a black level during the horizontal and vertical synchronisation periods. By doing this, the invention does not need to use any common mode signalling paths to signal the horizontal and vertical syncs and hence leaves these paths available for signalling audio data.

Figure 3:
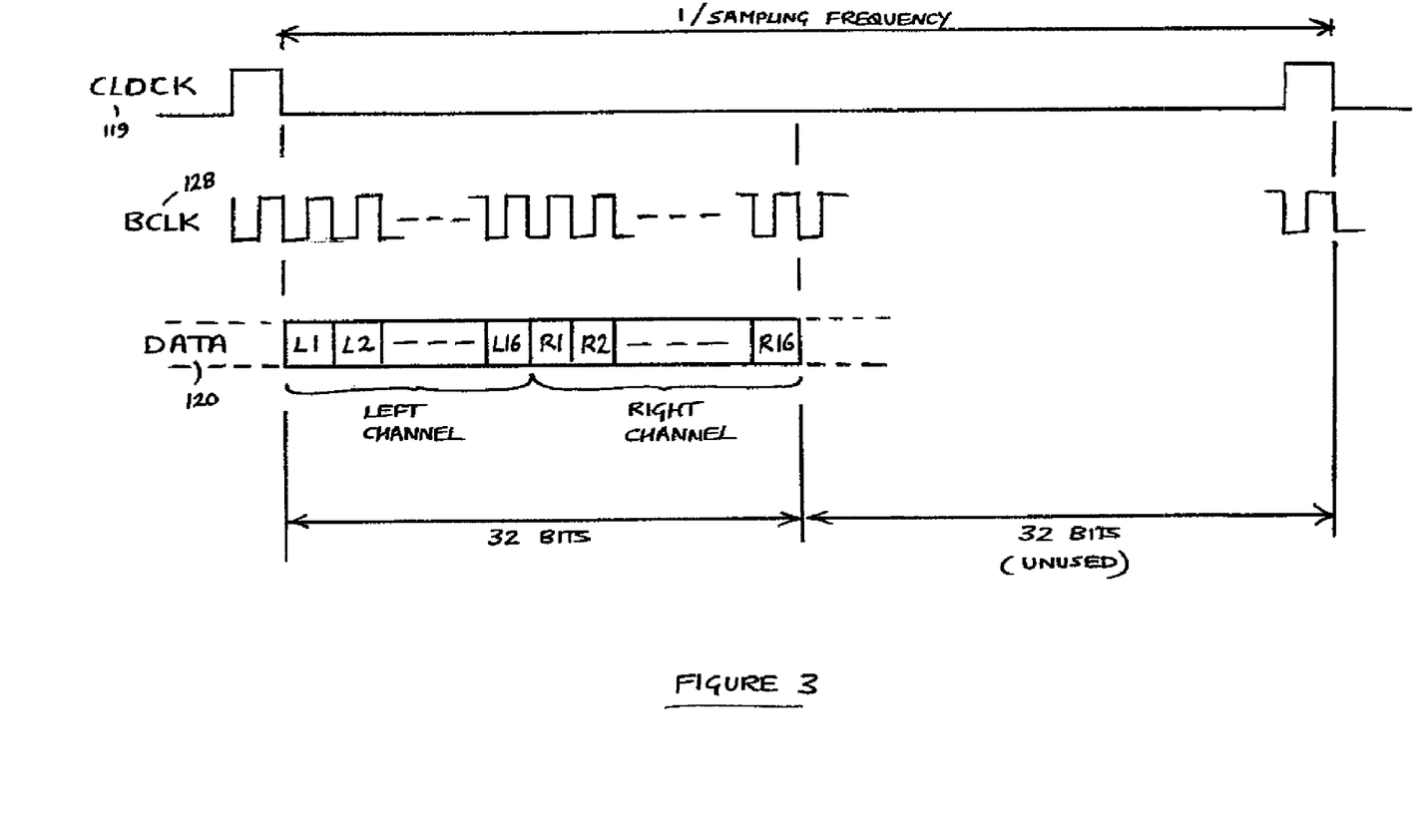
FIG. 3 illustrates the time variation of various signals associated with the transmission of digital samples of analogue audio signals as used in the invention.
Figure 4:
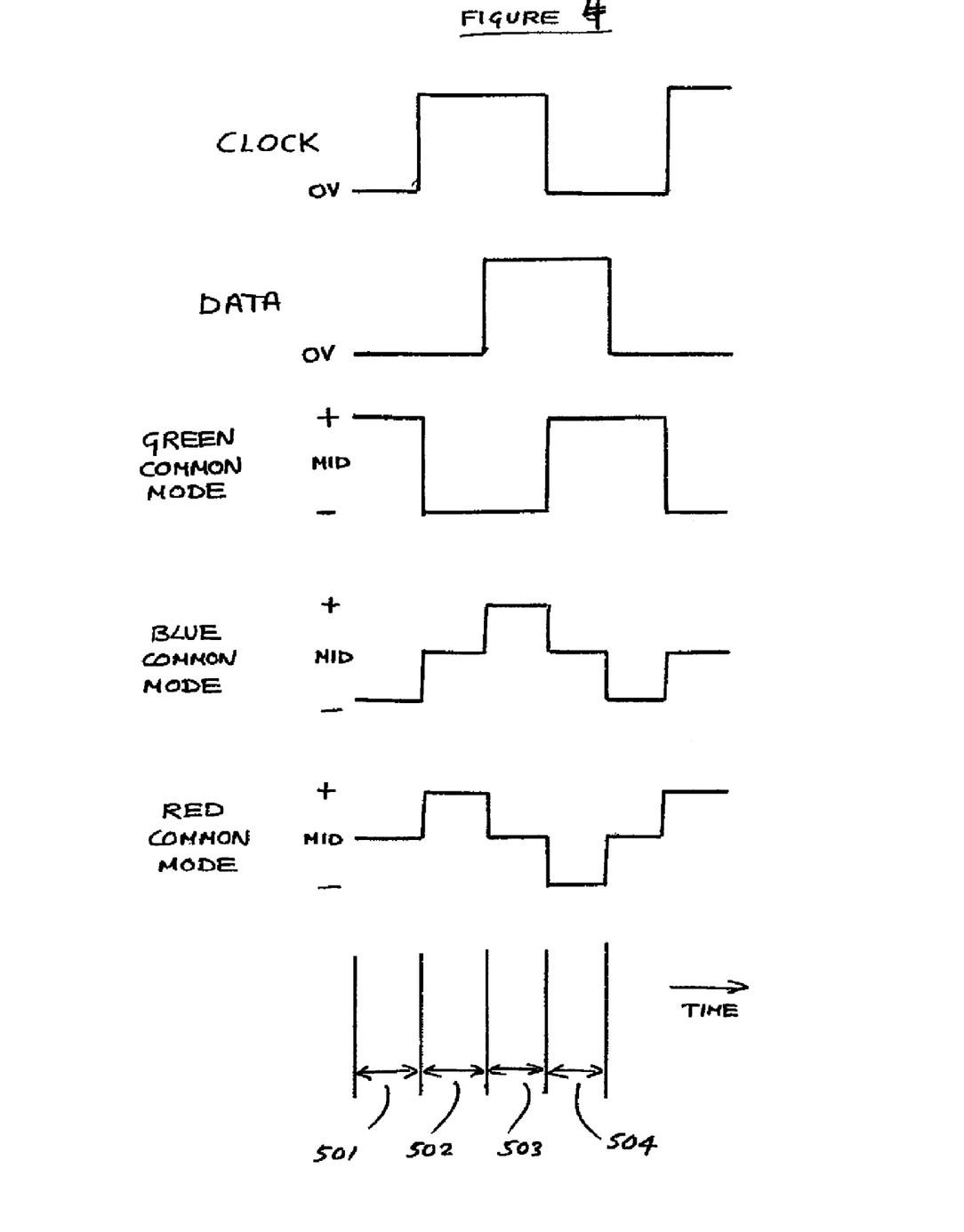
FIG. 4 illustrates signals associated with an embodiment of a method of transmitting two data signals using a balanced common mode signalling technique according to the invention.

Analogue left and right audio signals 115, 116 are provided to the transmitter from the audio source 104. These are fed into a TLV320AIC23 codec provided by Texas Instruments 117. An external 11.2896 MHz crystal 118 provides a clock input to the codec 117 which is configured to sample the analogue audio signals at 44.1 kHz at a 16-bit resolution. The codec outputs the results of the analogue to digital conversions via a clock 119 and data signal 120. The formats of these signals are shown in FIG. 3. The clock signal identifies the start of the sampled data. The audio data signal consists of 16 bits of data representing a sample of the left audio signal followed by 16 bits of data representing a sample of the right audio signal followed by 32 unused bits.

The clock 119 and data 120 signals being generated by the codec 118 are fed into the Vsync 120 and Hsync 121 inputs of a transmitter circuit provided by an Intersil EL4543 triple line driver 211. These signals are transmitted via the encoded balanced common mode signalling technique previously described over twisted pairs 109,110 and 111.

Figure 5:
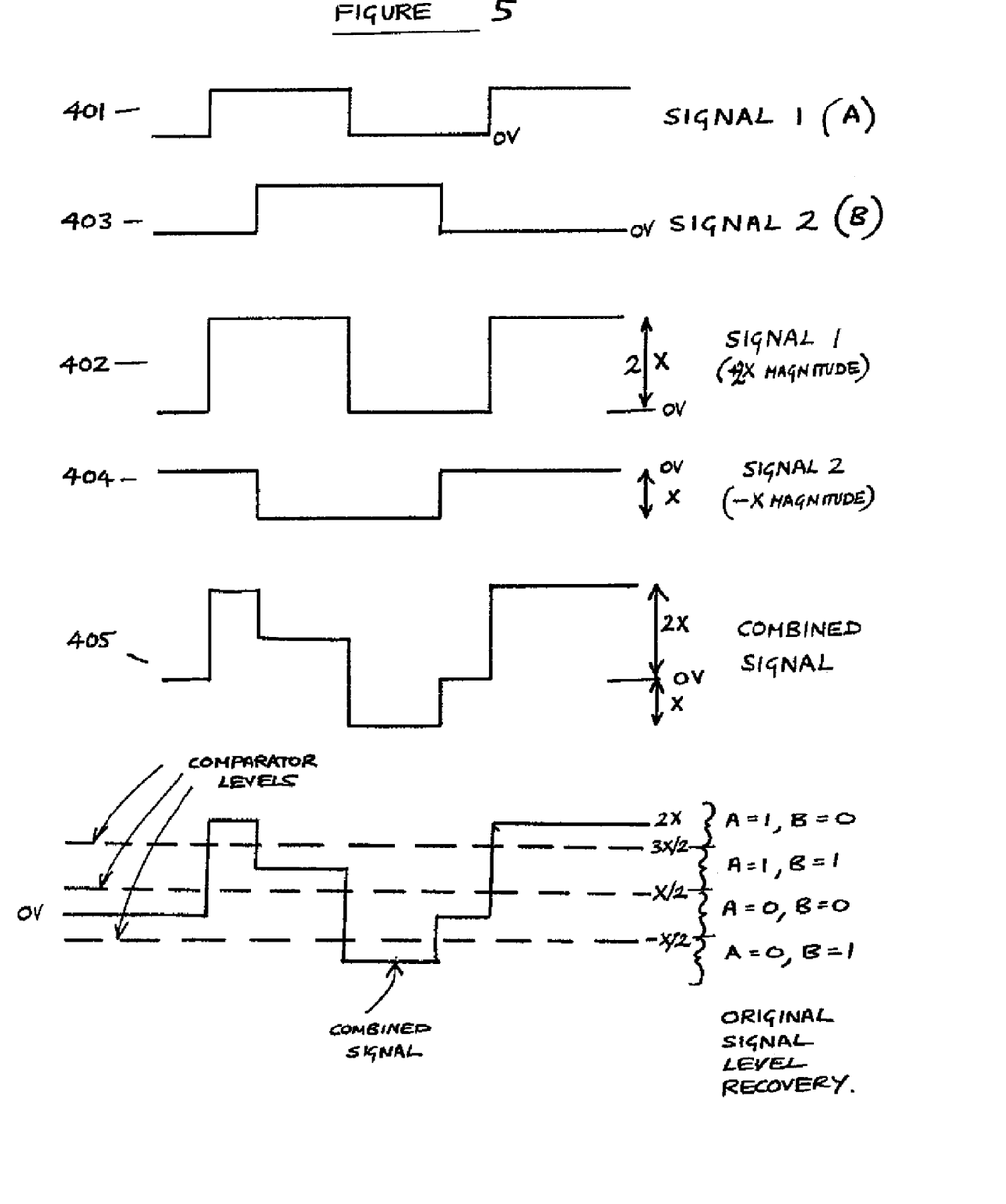
FIG. 5 illustrates signals associated with an alternative embodiment of a method of transmitting two data signals using a balanced common mode signalling technique according to the invention.

FIG. 5 illustrates the way in which the common mode signals on the green 109, blue 110 and red pairs vary according to the states of the clock 119 and data 120 signals. There are four possible states of the clock and data lines (clock low and data low, data low and clock high, clock high and data high, clock low and data high). These four states are indicated by the common mode signals shown in time periods 501, 502, 503 and 504 respectively. It can be seen that in any of time periods 501, 502, 503, 504 one of the common mode signals is in the positive state, one is in the negative state and one is at the mid point level. This ensures that balanced common mode signalling requirements are maintained. For example, in time period 501 when the clock and data signals are low, this state is signalled by the green common mode signal being positive relative to the mid point level, the blue common mode signal being negative relative to the mid point level and the red common mode signal being at the mid-point level.

The recovered clock 119 and data 120 signals appear at the Vsync Out 122 and HSync Out 123 outputs of a receiver circuit, provided by an Intersil EL9111 triple line receiver 134. These signals provides a continuous stream of audio sample data to the codec 124 which performs the necessary digital to analogue conversions to turn the data back into left and right analogue audio signals 125, 126. In order to perform this conversion, the Texas Instruments TLV320AIC23 codec 124 is fed with suitable master clock (MCLK) 127 and bit clock (BCLK) 128 signals. The bit clock signal is used by the codec 124 to sample the data signal 120. A suitable MCLK frequency is double the BCLK frequency. The MCLK and BCLK signals are not transmitted from the transmitter and are therefore generated within the receiver circuit.

The BCLK 128 and MCLK 127 signals are derived from the clock signal 119 using a Phase Lock Loop circuit 129 coupled with a 'divide by 128' circuit 130. The Phase Lock Loop circuit consists of a 74HCT4046 with associated resistor and capacitor components to create a starting frequency of the output signal 131 close to the required MCLK frequency which is approximately 5.6448 MHz for a 44.1 kHz sampling rate. Signal 131 is fed into a 'divide by 128' circuit 130 to create an output signal 132. The 'divide by 128' circuit is implemented in the current invention using two 74HCT161 4-bit counters and a tap off from this circuit gives a 'divide by 2' function which is used to create the BCLK signal which is half the frequency of the MCLK signal and 64 times the frequency of the clock 119 signal.

The PLL circuit 129 acts to synchronise signal 132 with the clock signal 119 thus ensuring that the BCLK signal 128 is synchronised to the incoming data signal so that the codec 124 knows when to sample the data 120. FIG. 3 shows the relationship between the bit clock signal 128, the audio data signal 120 and the clock signal 119.

It can be seen that the current invention provides an elegant solution to the problem of sending video and audio signals over a twisted pair cable and that it can be implemented using relatively few components making it straightforward and cost effective to build.

Referring now to the video circuitry within the receiver circuit 102. Potentiometers 170 and 180 are provided in order to supply control signals to the EL9111 triple receiver to compensate for the signal loss of the twisted pair cable. Potentiometer 170 controls the sharpness of the picture and potentiometer 180 controls the brightness of the picture. The user of the extender may adjust the settings of these potentiometers to produce the best picture on the screen. These potentiometers adjust the AC and DC amplification that is applied to the received differential signals.

The green +Vsync signal 213 appears at the green colour output of the Intersil EL9111 triple receiver chip 134 and is fed into a sync extraction circuit 135 that detects signals with voltages less than the threshold level 214 shown in FIG. 2. By detecting voltages lower than this threshold, the Vsync signal can be recovered which in turn enables the negative Vsync pulses to be removed from the combined signal to recover the green colour signal 136. The recovered Vsync pulse is fed into the polarity restore circuit 137 that is in receipt of a signal 139 from the receiver's microprocessor 138 that indicates the polarity of the original signal Vsync 140. Using this information, the polarity restore circuit 137 restores the polarity of the Vsync signal 141 to match the original polarity of Vsync signal 140. The Hsync and red video signals 142 143 are extracted from the combined signal 144 using sync extraction circuit 145 and polarity restore circuit 146 in a similar manner.

The preferred embodiment of the invention also implements a bidirectional serial port link between the transmitter and the receiver. Incoming serial signals at the receiver 147 are level shifted 148 and periodically sampled by the PIC 16F870 microprocessor 138, as supplied by MicroChip Inc. This microprocessor is in communication with a second PIC 16F870 149 within the transmitter circuit via the twisted pair 112 and 75176 line driver/receivers 150 and 151. A suitable data communication protocol is implemented that enables the microprocessors to exchange data. The receiving microprocessor 149 signals the state of the original signals 147. These signals are level shifted 152 to create signals that are suitable for transmission to RS232 port 105. Similarly incoming signals 153 from RS232 port 105 are level shifted, sampled and communicated to the receiver circuit 102 via the two microprocessors 149 138, the line diver/receivers 150 151 and the twisted pair 112 where they are level shifted back 148 for transmission to RS232 port 108. In this way, a bidirectional RS232 signalling means is provided between the receiver and transmitter circuits. Signals 154 and 155 indicating the polarity of the original Hsync 157 and Vsync 140 signals and derived from the polarity detection circuits 114 and 113 enable microprocessor 149 to communicate the polarity information to microprocessor 138 over the data pair 112 to create signals 139 and 156. These signals are fed to the polarity restoration circuits 137 and 145 within the receiver circuit 102 so that the polarity of the outgoing Vsync 141 and Hsync 142 signals is the same as the polarity of the equivalent Hsync 157 and Vsync 140 input signals.

FIG. 5 illustrates an alternative embodiment of the method of transferring two digital signals between a transmitter and receiver using balanced common mode signalling between two twisted pairs according to the invention. The first digital signal 401 is converted into positive signal 402 of magnitude 2X. The second digital signal 403 is converted into a negative signal 404 of magnitude X. These signals 402 and 404 are then summed to create a combined signal 405 which ranges between voltages −X and +2X. This is then transmitted via two twisted pairs as a balanced common mode signal. Comparators at the receiver are arranged to detect whether the combined signal falls above or below the threshold levels of −X/2, X/2 and 3X/2. Using this information, the receiver can determine the original signal states of signal 401 (A) and signal 403 (B) as shown in FIG. 5. It will readily be appreciated that the exact signal voltage levels used to implement this technique may be chosen to suit the implementation.

What is claimed is:

1. A method for transmitting video and audio signals via three twisted pairs of conductors comprising:
   transmitting a differential signal that contains video colour information over each twisted pair; and
   transmitting data representing digital samples of at least one audio signal on two or more of the twisted pairs as common mode signals,
   wherein the data transferred as common mode signals on two or more pairs are sent as a clock signal and a data signal that together contain information about periodic samples of at least one audio signal.

2. The method as claimed in claim 1, in which:
   a first twisted pair of conductors carries a differential signal containing green video colour information; and
   a second twisted pair of conductors carries a differential signal containing red video colour information; and
   the third twisted pair of conductors carries a differential signal containing blue video colour information.

3. The method as claimed in claim 1, in which:
   a first twisted pair of conductors carries a differential signal containing video colour information and vertical synchronisation information; and
   a second twisted pair of conductors carries a differential signal containing video colour information and horizontal synchronisation information.

4. The method as claimed in claim 1, in which digital audio data is transmitted using balanced common mode signalling by applying a positive common mode signal to a first twisted pair and a half the magnitude, negative common mode signal to a second twisted pair.

5. The method as claimed in claim 1, in which the common mode signal includes a positive common mode signal applied to a first twisted pair, an equal magnitude, negative common mode signal applied to a second twisted pair and a mid-point common mode signal applied to a third twisted pair and changing which twisted pair the positive, negative and mid-point signals are sent on in order to communicate the digital audio data.

6. The method as claimed in claim 1, in which the horizontal and vertical signalling facilities of a transmitter video chip and/or a receiver video chip are used to communicate the common mode audio signals.

7. The method as claimed in claim 1, wherein the clock and data signals are generated by an analogue to digital converter or codec that samples one or more analogue audio signals.

8. The method as claimed in claim 1, wherein received clock and data signals are fed into a digital to analogue converter or codec that converts the digital sample data into one or more analogue audio signals.

9. The method as claimed in claim 1, wherein a phase locked loop circuit and a divider circuit are used to derive a received data sampling clock signal.

10. The method as claimed in claim 1, in which the common mode signals are sent using only two twisted pairs.

11. The method as claimed in claim 10, in which a sampling clock signal and a sampled audio data signal are combined for transmission as common mode signals and the received combined signal is thresholded to determine the state of the sampling clock signal and the audio data signal.

12. The method as claimed in claim 11, in which the sampling clock signal and sampled audio data signal have opposite signs and the magnitude of the clock signal or data signal is increased before combining the signals.

13. Apparatus for transmitting video and audio signals via three twisted pairs of conductors, comprising a transmitter circuit which can receive video signals as an input and which can output signals for transmission as a differential signal containing video colour information over each twisted pair, wherein the transmitter circuit can further receive digital audio data as an input and output signals representing the digital audio data for transmission as common mode signals over at least two of the twisted pairs, wherein the transmitter circuit is configured to transfer the data as common mode signals on at least two pairs as a clock signal and a data signal that together contain information about periodic samples of at least one audio signal.

14. Apparatus for receiving video and audio signals via three twisted pairs of conductors, comprising a receiver circuit which can receive video signals transmitted as a differential signal over each twisted pair and which can output analog video signals, wherein the receiver circuit can further receive signals representing digital audio data transmitted as common mode signals over at least two of the twisted pairs and output digital audio data, wherein the receiver circuit is configured to receive the data transferred as common mode signals on at least two pairs as a clock signal and a data signal that together contain information about periodic samples of at least one audio signal.

15. A method for transmitting video and audio signals via three twisted pairs of conductors comprising:
    transmitting a differential signal that contains video colour information over each twisted pair; and
    transmitting data representing digital samples of at least one audio signal on two or more of the twisted pairs as common mode signals,
    wherein the common mode signals include a positive common mode signal applied to a first twisted pair, an equal magnitude, negative common mode signal applied to a second twisted pair and a mid-point common mode signal applied to a third twisted pair and changing which twisted pair the positive, negative and mid-point signals are sent on in order to communicate the digital audio data.

16. A method for transmitting video and audio signals via three twisted pairs of conductors comprising:
    transmitting a differential signal that contains video colour information over each twisted pair; and
    transmitting data representing digital samples of at least one audio signal on two or more of the twisted pairs as common mode signals,
    wherein horizontal and vertical signalling facilities of a transmitter video chip and/or a receiver video chip are used to communicate the common mode audio signals.

* * * * *